(12) United States Patent
Wallerstein et al.

(10) Patent No.: US 9,948,501 B2
(45) Date of Patent: Apr. 17, 2018

(54) PRIORITIZING EVENT NOTICES UTILIZING PAST-PREFERENCE PAIRINGS

(71) Applicant: Hewlett-Packard Development Company, L.P., Houston, TX (US)

(72) Inventors: Roy Wallerstein, Yehud (IL); Anat Levinger, Yehud (IL); Ira Cohen, Yehud (IL); Avi Kabizon, Yehud (IL); Ohad Assulin, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 261 days.

(21) Appl. No.: 14/787,555

(22) PCT Filed: Jun. 18, 2013

(86) PCT No.: PCT/US2013/046295
§ 371 (c)(1),
(2) Date: Oct. 28, 2015

(87) PCT Pub. No.: WO2014/204442
PCT Pub. Date: Dec. 24, 2014

(65) Prior Publication Data
US 2016/0112244 A1    Apr. 21, 2016

(51) Int. Cl.
*H04L 12/24*    (2006.01)
*G06Q 10/10*    (2012.01)
*G06Q 50/32*    (2012.01)

(52) U.S. Cl.
CPC ........... *H04L 41/065* (2013.01); *G06Q 10/10* (2013.01); *H04L 41/069* (2013.01); *H04L 41/5022* (2013.01); *G06Q 50/32* (2013.01)

(58) Field of Classification Search
CPC . H04L 41/069; H04L 41/065; H04L 41/5022; G06Q 10/10; G06Q 50/32
See application file for complete search history.

(56) References Cited

U.S. PATENT DOCUMENTS

| | | | |
|---|---|---|---|
| 8,214,687 B2 | 7/2012 | Colaiacomo et al. | |
| 8,255,425 B1 * | 8/2012 | Li | G06F 17/30144 707/737 |

(Continued)

FOREIGN PATENT DOCUMENTS

| | | |
|---|---|---|
| CN | 1429372 A | 7/2003 |
| CN | 1959717 | 5/2007 |

(Continued)

OTHER PUBLICATIONS

"Predictive Intelligence Identify Future Problems and Prevent Them From Happening", < http://documents.bmc.com/products/documents/00/60/100060/100060.pdf >, Aug. 20, 2009.

(Continued)

*Primary Examiner* — Kim T Nguyen (57) ABSTRACT

In one example of the disclosure, event notices are received, with each notice indicative of degradation of a configuration item. Configuration item past-preference pairings are accessed. Each pairing includes a count of operator-exhibited preferences for event notices associated with a first configuration item relative to event notices associated with a second configuration item. A prioritized ordering of the received event notices is created utilizing the past-preference pairings.

15 Claims, 7 Drawing Sheets

(56) References Cited

U.S. PATENT DOCUMENTS

| | | | |
|---|---|---|---|
| 2009/0313198 A1* | 12/2009 | Kudo | G06F 11/0709 706/47 |
| 2011/0010726 A1 | 1/2011 | Dayal et al. | |
| 2011/0119212 A1 | 5/2011 | De Bruin et al. | |
| 2011/0219271 A1* | 9/2011 | Kaneko | G06F 11/07 714/47.1 |
| 2011/0288692 A1 | 11/2011 | Scott | |
| 2012/0151272 A1 | 6/2012 | Behrendt et al. | |
| 2013/0117399 A1 | 5/2013 | Appelman et al. | |

FOREIGN PATENT DOCUMENTS

| | | |
|---|---|---|
| CN | 202133897 U | 2/2012 |
| KR | 1020020000603 A | 1/2002 |
| KR | 1020030027881 A | 4/2003 |

OTHER PUBLICATIONS

International Search Report and Written Opinion received in PCT Application No. PCT/US2013/046295, dated Mar. 24, 2014, 11 pgs.
Yoo et al.; "Machine Learning Methods for Personalized Email Prioritization", < http://www.lti.cs.cmu.edu/research/thesis/2010/shinjae_yoo.pdf >, Jun. 10, 2010.

* cited by examiner

| | Cl-1 | Cl-2 | Cl-3 | Cl-4 | Cl-5 | Cl-6 | Cl-7 | Cl-8 | Cl-9 | Cl-10 | Cl-11 | Cl-12 | Cl-13 | Cl-14 |
|---|---|---|---|---|---|---|---|---|---|---|---|---|---|---|
| Cl-1 | | 8 | 8 | 6 | 6 | 4 | 4 | 6 | 4 | 6 | 2 | 4 | 4 | 5 |
| Cl-2 | 14 | | 8 | 9 | 16 | 10 | 7 | 11 | 6 | 5 | 8 | 10 | 6 | 4 |
| Cl-3 | 10 | 10 | | 11 | 8 | 8 | 11 | 9 | 7 | 1 | 8 | 3 | 6 | 6 |
| Cl-4 | 16 | 10 | 9 | | 6 | 10 | 3 | 7 | 10 | 9 | 9 | 6 | 5 | 5 |
| Cl-5 | 9 | 9 | 11 | 8 | | 6 | 9 | 9 | 9 | 8 | 9 | 8 | 4 | 7 |
| Cl-6 | 18 | 11 | 20 | 10 | 11 | | 14 | 5 | 9 | 9 | 9 | 8 | 4 | 6 |
| Cl-7 | 17 | 12 | 10 | 11 | 14 | 6 | | 8 | 7 | 8 | 10 | 4 | 4 | 10 |
| Cl-8 | 16 | 16 | 17 | 15 | 16 | 14 | 13 | | 12 | 12 | 5 | 9 | 10 | 3 |
| Cl-9 | 12 | 13 | 13 | 17 | 16 | 15 | 7 | 9 | | 7 | 6 | 8 | 5 | 14 |
| Cl-10 | 15 | 17 | 20 | 7 | 16 | 8 | 6 | 14 | 8 | | 7 | 10 | 8 | 11 |
| Cl-11 | 20 | 16 | 13 | 15 | 11 | 14 | 10 | 13 | 7 | 12 | | 12 | 10 | 8 |
| Cl-12 | 16 | 17 | 9 | 15 | 9 | 19 | 13 | 16 | 8 | 14 | 10 | | 14 | 8 |
| Cl-13 | 12 | 13 | 17 | 10 | 14 | 15 | 11 | 13 | 7 | 8 | 12 | 10 | | 10 |
| Cl-14 | 15 | 9 | 16 | 11 | 14 | 16 | 10 | 10 | 11 | 7 | 15 | 12 | 11 | |

FIG. 3

| Priority/Order to Remediate | Date Received | Time Received | Event Title | Related Configuration Item | CI Number |
|---|---|---|---|---|---|
| 1 | 05/02/13 | 8:16:54 PM | Sales Center Server Down | Cluster 006 | 6 |
| 2 | 05/02/13 | 11:55:42 PM | Database is down | SQL Server 101 | 101 |
| 3 | 05/02/13 | 8:17:04 PM | Calculation speed SLA not met | Host 192 | 192 |
| 4 | 05/02/13 | 10:34:05 PM | Physical Server is down | LPAR 002 | 2 |
| 5 | 05/02/13 | 10:32:05 PM | Management LPAR is down, physical server is up | LPAR 044 | 44 |
| 6 | 05/05/13 | 9:18:40 PM | Disk Quota Exceeded | Host 003 | 3 |
| 7 | 05/02/13 | 2:03:37 AM | Database storage is full | SQL Server 101 | 101 |
| 8 | 05/02/13 | 9:18:49 PM | CPU over 80% | Host 079 | 79 |
| 9 | 05/05/13 | 1:04:53 AM | Too many connections | SQL Programming 007 | 7 |
| 10 | 05/02/13 | 8:55:11 PM | Available RAM memory < 1024 MB | Host 378 | 378 |
| ... | ... | ... | ... | ... | ... |

| Date Received | Time Received | Event Title | Configuration Item | CI Number | Corrective Action |
|---|---|---|---|---|---|
| 01/02/13 | 11:28:12 AM | Database storage is full | SQL Server 101 | 101 | assigned to Operator 573 |
| 01/02/13 | 11:55:54 PM | HR Server Down | Cluster 002 | 2 | assigned to Operator 737 |
| 01/31/13 | 6:12:01 PM | Available RAM memory < 1024 MB | Host 378 | 378 | assigned to Operator 500 |
| 01/31/13 | 10:39:03 PM | CPU over 80% | Host 102 | 102 | assigned to Operator 403 |
| 02/12/13 | 9:08:19 PM | Management LPAR is down, physical server is up | LPAR 044 | 44 | assigned to Operator 827 |
| 02/12/13 | 10:04:03 PM | Too many connections | SQL Server 015 | 15 | assigned to Operator 057 |
| 04/23/13 | 10:39:45 PM | Sales Center Server Down | Cluster 017 | 17 | assigned to Operator 501 |
| 04/23/13 | 11:48:04 PM | Too many connections | SQL Server 074 | 74 | assigned to Operator 499 |
| 04/24/13 | 9:51:01 AM | Disk Quota Exceeded | Host 005 | 5 | assigned to Operator 134 |
| 04/30/13 | 1:03:03 PM | Physical Server is down | LPAR 043 | 43 | assigned to Operator 827 |
| 05/01/13 | 10:39:03 PM | CPU over 80% | Host 79 | 79 | assigned to Operator 403 |
| 05/05/13 | 2:03:37 AM | Database storage is full | SQL Server 101 | 101 | assigned to Operator 376 |
| 05/02/13 | 8:55:11 PM | Available RAM memory < 1024 MB | Host 378 | 378 | assigned to Operator 207 |
| 05/02/13 | 10:32:05 PM | Management LPAR is down, physical server is up | LPAR 044 | 44 | assigned to Operator 429 |

PRIORITIZING EVENT NOTICES UTILIZING PAST-PREFERENCE PAIRINGS

BACKGROUND

An entity that provides Information Technology ("IT") services to an enterprise customer is faced with a challenge of constant vigilance to identify and address potential risks to the customer and the customer' systems. In today's complex virtualized and cloud environments, an operator that is tasked with reviewing IT events and identifying risks may review hundreds of IT events per day.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

DETAILED DESCRIPTION OF EXAMPLES

An IT service provider should address a customer's events that have a high impact on the business (e.g., certain servers, applications, etc.) prior to the customer's events with lower impact. IT service providers and their enterprise customers are therefore both desirous to optimize prioritization of incoming event notices. However, accurately prioritizing incoming event notices can be a difficult and time-consuming task for several reasons. First, manually entering a customer's priorities will often be difficult expensive in light of the large number of potential event notices and/or related configuration items to be prioritized. Further, assuming an IT service provider creates such an event notice priority list for an enterprise customer, in many situations the IT service provider would need to continually adjust the list to adapt to changes in circumstances, changes in equipment, and changes in the customer's priorities. Likewise, in many situations an IT service provider will find it difficult and expensive to implement an automated approach for event prioritization. Such automated approaches have often required an exhaustive modeling of event notice and related configuration item scenarios. Magnifying the complexity of implementing an event prioritization system is the fact that in many situations enterprise customers of an IT service provider can have specific ways to prioritize event handling, e.g. depending on their business model.

To address these issues, examples described herein may provide a system and method to, in an automated manner, accurately and reliably prioritize received event notices utilizing past-preference pairings of event notices and configuration items. In an example of the disclosure, an event notice prioritization service may receive a plurality of event notices, with each notice indicative of degradation of a configuration item. In examples, the configuration item may be a hardware item, a software item, a combination of hardware and software, or a service level relating an item or items of hardware and/or software. In an example, the configuration item may be a cluster, grouping, or other set of hardware items and/or software items. In an example, the configuration item may be a set of service levels. The event prioritization service accesses a set of configuration item past-preference pairings. Each of the past-preference pairings within the set includes a count of operator-exhibited preferences for event notices associated with a first configuration item relative to event notices associated with a second configuration item. The event prioritization service in turn creates a prioritized ordering of the received event notices utilizing the past-preference pairings.

Advantages of the disclosure are numerous. First, users will appreciate that the disclosed system and method enable IT service providers to accurately and reliably prioritize received event notices in an automated manner, without requirements of explicit user labeling or of exhaustive event notice/configuration item modeling by the IT service provider. IT Service providers will be able to prioritize incoming event notices in an efficient, reliable and uninterrupted manner that takes into account changes in the IT environment, changes in the customer's priorities, and other changes in circumstances. Further, as manual prioritization ranking and scenario modeling are not required, the disclosed event notice prioritization is scalable and can easily be applied to customers with disparate event handling processes and business needs. Advantages of the disclosure will cause customer satisfaction with automatic event notice prioritization and with IT service providers generally, to increase.

As used in this application, a "past-preference pairing" refers to a count of preferences exhibited by an operator or operators for event notices associated with a first configuration item relative to event notices associated with a second configuration item. An "event notice" refers to a message that informs a state of a configuration item has changed. A "configuration item" refers to any item that is monitored, e.g. by a configuration management system, to identify degradation, reduction in functionality, or changes in state. A "service level" refers to a measure of performance of a system, or components (e.g., hardware or software) of a system. In an example, service levels may correlate with service level goals defined in a contract between a customer and an IT service provider. A "logical component" is used synonymously with "virtual component" and refers to a component that does not actually exist as a single physical entity in its own right. In an example, a logical component may be a component defined via disk partitioning. "Disk partitioning" refers to the act of dividing a hard disk drive into multiple logical storage units referred to as partitions, to treat one physical disk drive as if it were multiple disks, so that different file systems can be used on each partition. A "matrix" refers to a rectangular array of numbers, symbols, or expressions, arranged in rows and columns. A "pairwise prioritization algorithm" refers to a method or process for comparing entities in pairs to judge which of each entity is preferred, or has a greater amount of some quantitative property. An "operator" of a computer system or computing device refers to a user that interacts with the system or device, e.g., via a user interface.

As used herein, a "processing resource" and a "processor" are used synonymously and refer generally any instruction execution system, such as a computer/processor based system or an ASIC (Application Specific integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Figure 1:
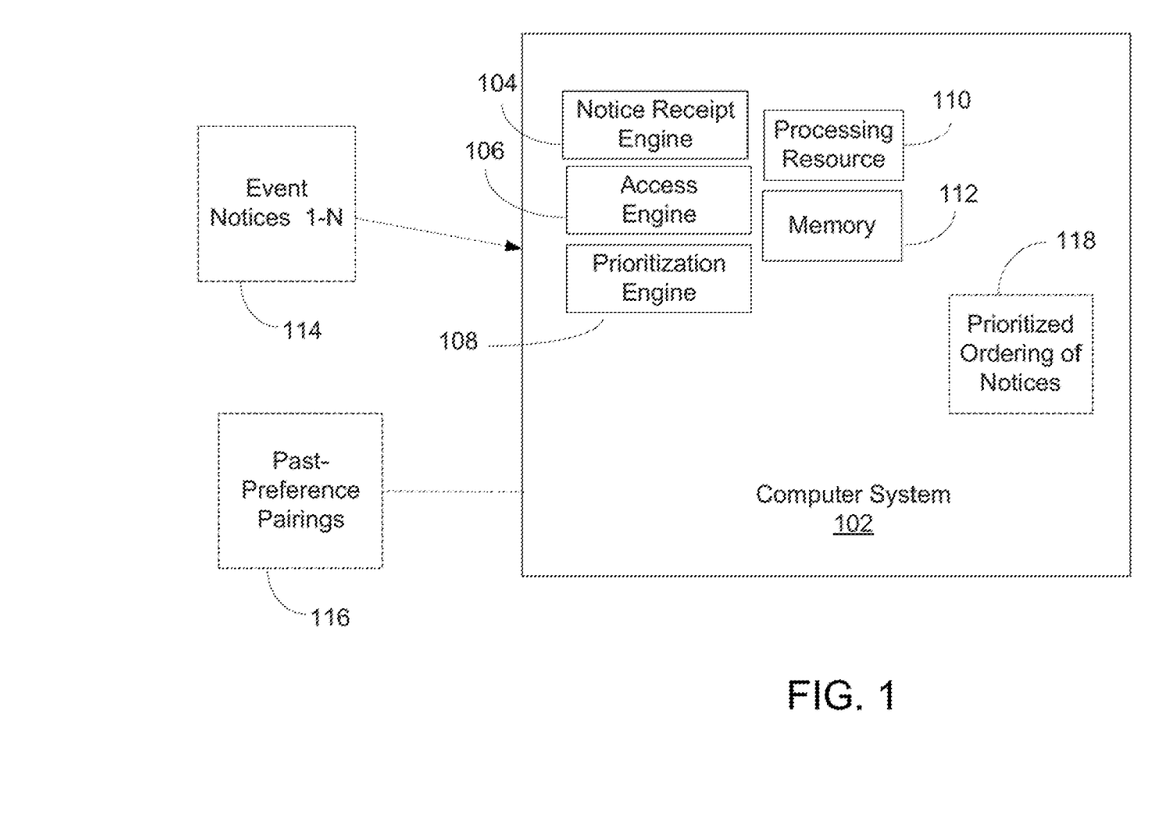
FIG. 1 is a block diagram illustrating an event prioritization system, according to various examples.

Referring now to the drawings, FIG. 1 is a block diagram illustrating an event prioritization system according to various examples. FIG. 1 depicts examples of physical and logical components for implementing various embodiments, including components are identified as engines 104 106 108. In describing engines 104 106 108, focus is on each engine's designated function. The term engine, as used herein, refers to a combination of hardware and programming configured to perform a designated function. However, in different examples, more, fewer, and/or other components, arrangements of components, etc. may be used according to the teachings described herein. In addition, various engines and other components described herein may be implemented as one or more software components, hardware components, special purpose hardware (e.g., application specific hardware, application specific integrated circuits (ASICs), embedded controllers, hardwired circuitry, etc.), or some combination of these.

FIG. 1 shows a computer system 102. Computer system 102 represents generally any computing device or group of computing devices configured to send and receive network requests, send and receive data and/or otherwise communicate with other computing devices via a network 104, including receiving event notices Computer system 102 is shown to include a notice receipt engine 104, an access engine 106, a prioritization engine 108, and a memory 112. In performing their respective functions, the engines 104 106 108 may access memory 112. Memory 112 represents generally any memory accessible to the engines 104 106 108 that can be used to configured to store and retrieve data.

In the example of FIG. 1, notice receipt engine 104 causes the computer system 102 to receive a plurality of event notices 114. Each of the event notices 1-N 114 is a message indicative of a change in state of a configuration item to a state that reflects a degradation in, or reduction in functionality of the configuration item as compared to the configuration item's former state, or as compared to the configuration item's desired state.

Figure 2:
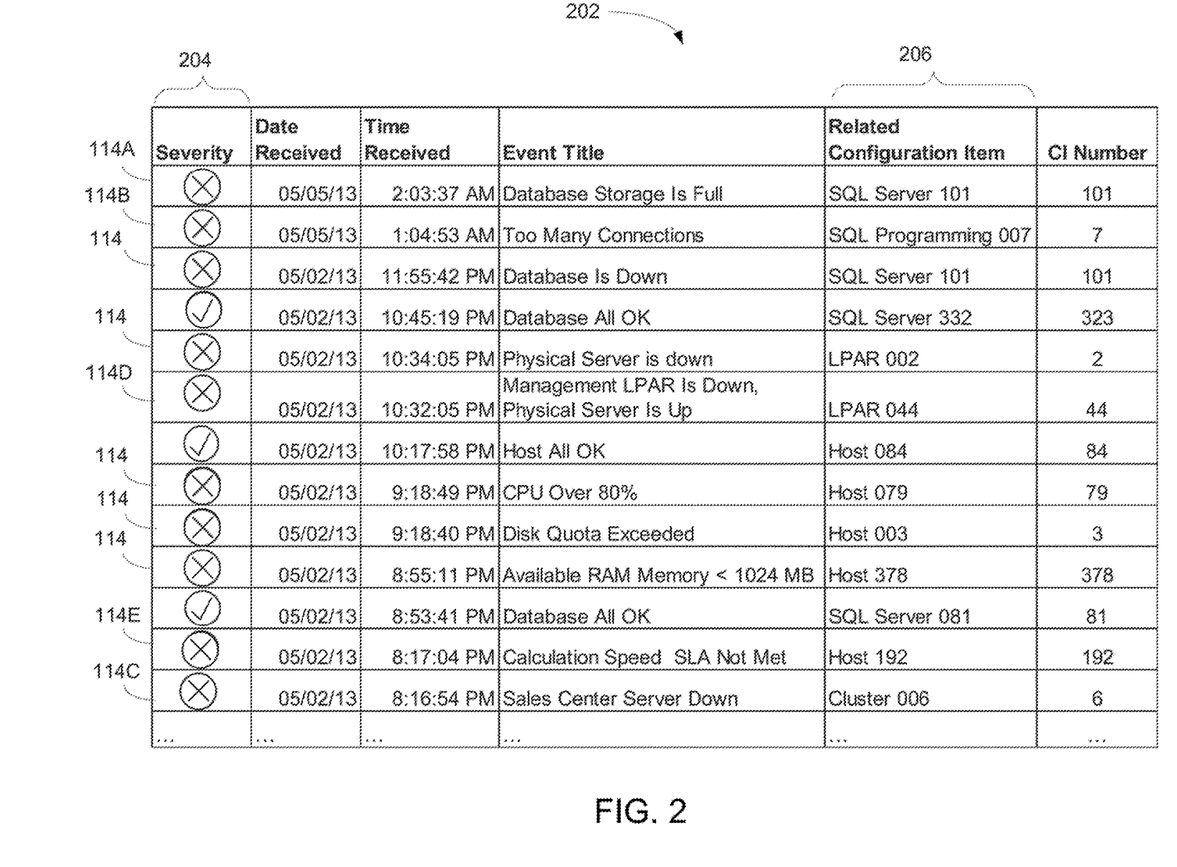
FIG. 2 is an example of an event notice dashboard display, according to various examples.

FIG. 2 provides examples of received event notices. FIG. 2 illustrates an event notice dashboard display 202 that can be presented to a user of computer system 102, e.g. via a monitor, touchscreen, or other display device. In this example, the event notices 114 are identified by a circled "X" in the "Severity" column 204 of the dashboard display 202. Each of the event notices 114 informs the user of a degradation state with respect to a configuration item with in the monitored system. The configuration items are denoted in the "Configuration Item" column 206 of the display 202. In examples, a configuration item may be a hardware item, a software item, a combination of hardware and software, or a service level relating an item or items of hardware and/or software. In an example, a configuration item may be a cluster, grouping, or other set of hardware items and/or software items. In an example, a configuration item may be a set of service levels. In the example of FIG. 2, the configuration items are uniquely identified relative to one another with a "CI number" so that the configuration item can be distinguished from other configuration items.

In the example of FIG. 2, a first event notice 114A is a message, to be presented to a user via the dashboard 202, that configuration item "SQL Server 101" (that is a hardware item or a combination of hardware and software) is in a degradation state of "database storage is too full." a second event notice 114B is a message that a configuration item "SQL Programming" that is a software item, is in a degradation state of "Too Many Connections." a third event notice 114D is a message that a configuration item "Cluster 006" is in a degradation state of "Sales Center Server Down." "Cluster 006" is a set of hardware and/or software components defined by a business service that the components are utilized to support. a fourth event notice 114D is a message that a configuration item "LPAR 044" is in a degradation state of "Management LPAR is down, physical server is up". In this example, "LPAR 044" is a logical component that does not exist as a single physical entity in its own right, e.g., a logical component defined by disk partitioning. a fifth event notice 114E is a message that a configuration item "Host 192" is in a degradation state of "Calculation Speed SLA Not Met." In this example, "Host 192" is a combination of hardware and software, and the degradation state is a failure to meet a service level.

Returning to the example of FIG. 1, the access engine 106 causes the computer system 102 to access a set of configuration item past-preference pairings 116. Each pairing within the set includes a count of occasions that a human operator who was presented with multiple event notices previously exhibited a preference for an event notice associated with a first configuration item relative to event notice associated with a second configuration item. In an example, the past-preference pairings may be stored in memory 112 or otherwise stored at computer system 102. In another example, the past-preference pairings 116 may be stored at a computer system or memory device external to computer system 102 and accessible via a network.

In an example, the count of preferences is a count of occurrences that an operator takes a corrective action relative to an event notice associated with a first configuration item ahead of taking the corrective action relative to an event notice associated with a second configuration item. In an example, an operator corrective action for an event notice that is counted may be an assignment of a task by the operator to another operator (e.g., signing a task to specialist operator). In another example, an operator corrective action for an event notice that is counted may be the operator sending or assigning the event notice to another computer system for remediation. In yet another example, an operator corrective action for an event notice that is counted may be the operator taking action himself or herself to fix configuration item degradation that is the subject of the event notice (e.g., resetting a device, running a calibration routine, etc.).

Figure 3:
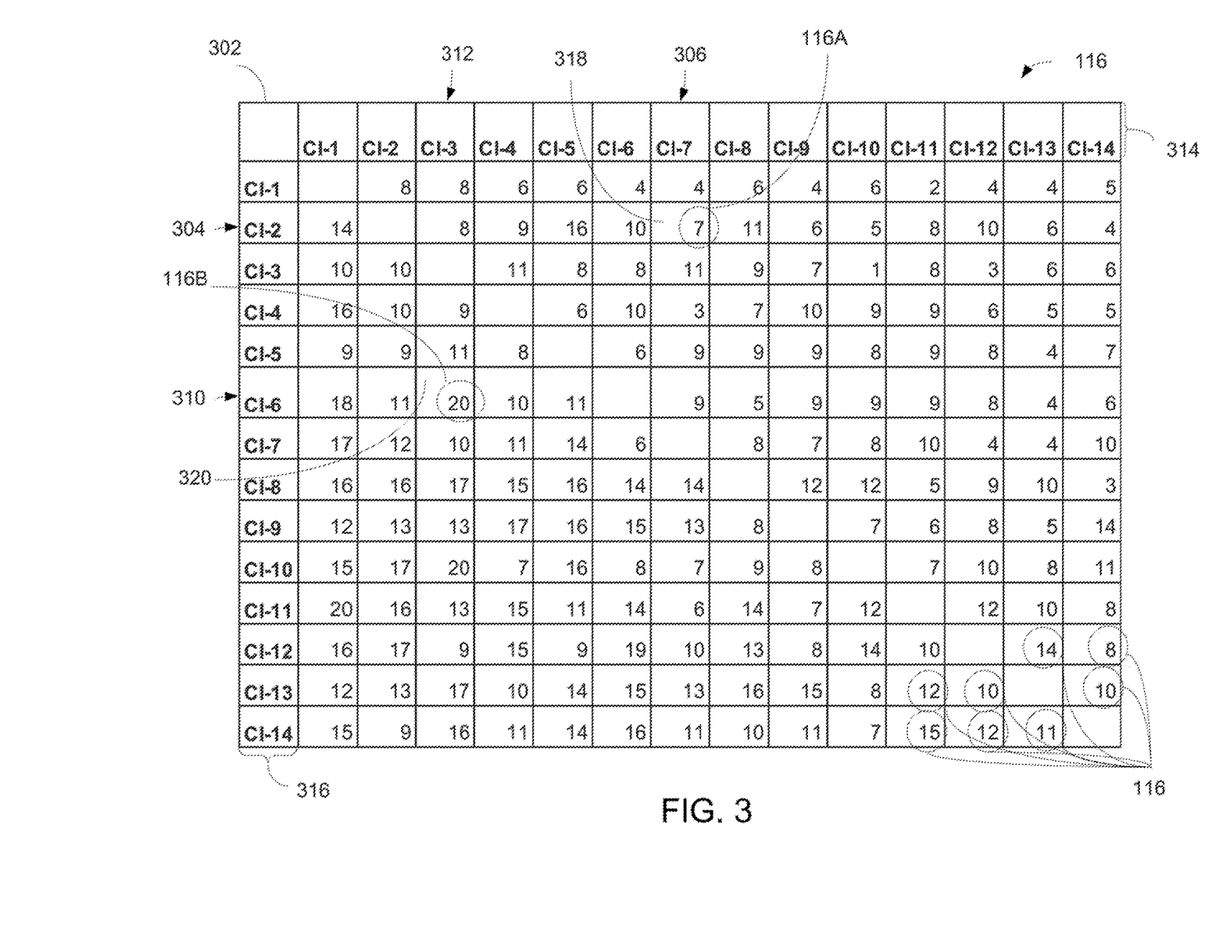
FIG. 3 is an example of a preferences count matrix, according to various examples.

In examples, the configuration item past-preference pairings 116 that are accessed by the computer system 102 pairings are pairings recorded within a matrix 302. FIG. 3 provides an example of a past-preference pairings matrix. The example matrix 302 of past-preference pairings 116 includes a column for each configuration item CI-1 through CI-14, and includes a row for each configuration item CI-1 through CI-14. The intersection of a row "a" and a column "b" defines a comparison cell "a/b" that includes a past-preference pairing 116A that is a count of occasions that an operator took a corrective action on an event associated with a configuration item "a" ahead of an event associated with a configuration item "b." For instance, the intersection of a row "CI-2" 304 and a column "CI-7" 306 defines a comparison cell "CI-2/CI-7" 318 that includes a past-preference pairing 116A that is a count of seven occasions 308 that an operator took a corrective action on an event associated with a configuration item "CI-2" ahead of an event associated with a configuration item "CI-7." The intersection of a row "CI-6" 310 and a column "CI-3" 312 defines a comparison cell "CI-6/CI-3" 320 that includes a past-preference pairing 116B that is a count of twenty occasions that an operator took a corrective action on an event associated with a configuration item "CI-6" ahead of an event associated with a configuration item "CI-3."

Figure 4:
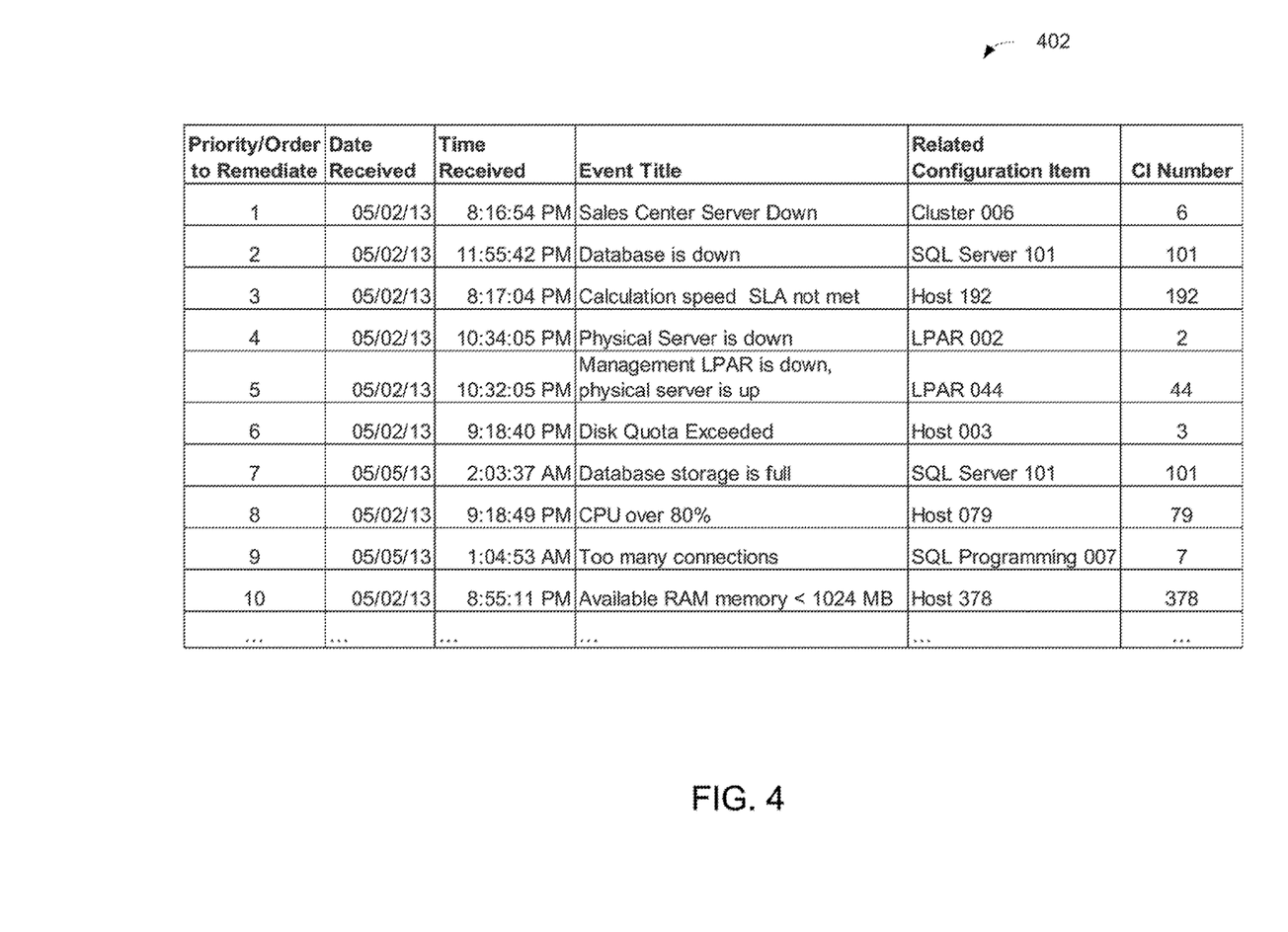
FIG. 4 is an example of a prioritized ordering of received event notices, according to various examples.

Returning to the example of FIG. 1 in view of FIGS. 2 and 3, the prioritization engine 108 causes the computer system 102 to create a prioritized ordering of the received event notices 114 utilizing the past-preference pairings 116. FIG. 4 provides an example of a prioritized ordering 402 of the received event notices of FIG. 1, wherein the ordering 402 was created utilizing configuration item past-preference pairings 116. In an example, the prioritization engine 108 may apply a pairwise prioritization algorithm to create the prioritized ordering. In a particular example, the prioritization engine may apply a Minimum Feedback Arc Set in Tournaments pairwise prioritization algorithm to create the prioritized ordering. In other examples, other pairwise prioritization algorithms may be utilized in creating the prioritized ordering.

In an example, tike functions and operations described with respect to the notice receipt engine 104, the access engine 106, the prioritization engine 108, and the computer system 102 may be implemented as a non-transitory computer-readable storage medium containing instructions executed by a processor (e.g., processing resource 110) and stored in a memory (e.g., memory 112) in a given implementation, processing resource 110 may represent multiple processor, and memory 112 may represent multiple memories.

Figure 5:
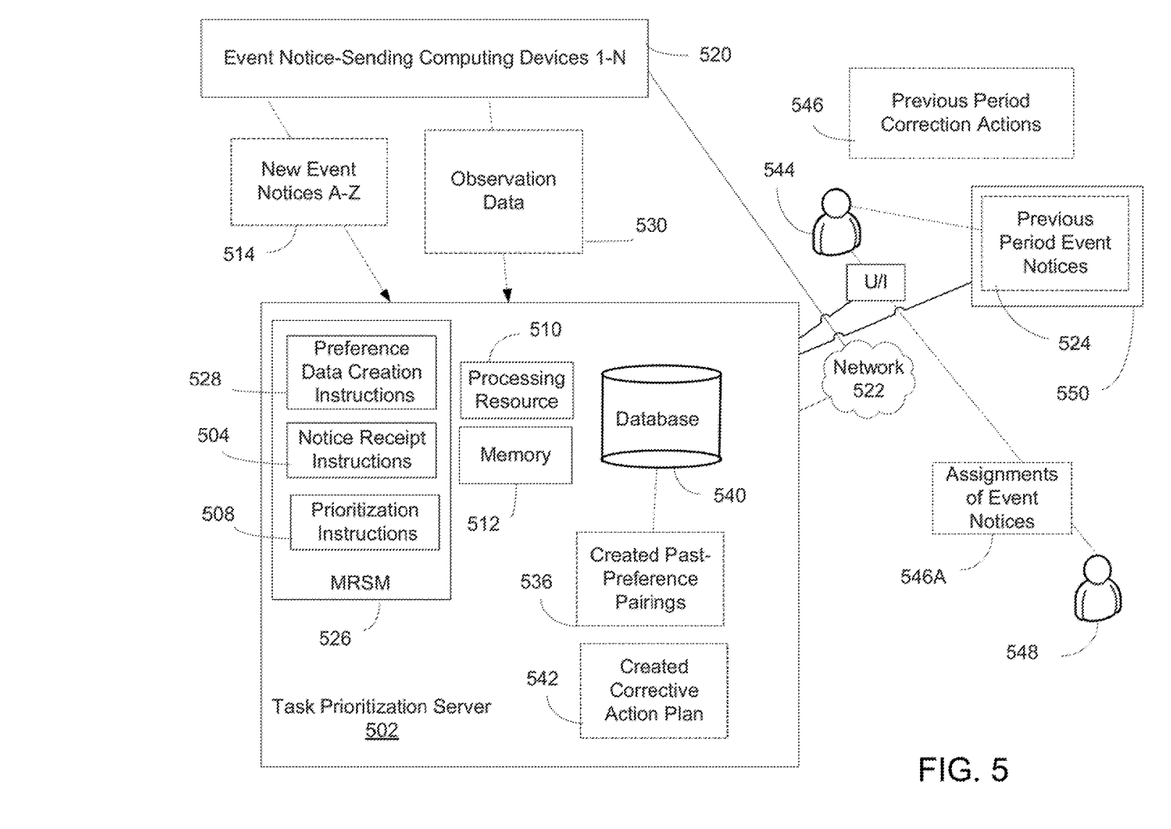
FIG. 5 is a block diagram illustrating an event prioritization system, according to various examples.

FIG. 5 is a block diagram illustrating an event prioritization system according to various examples. FIG. 5 shows a shows a task prioritization server 502 electronically connected to event-notice sending computing devices 1-N 520 via a network 522. Task prioritization server 502 represents generally any computing device or group of computing devices configured to send and receive network requests, send and receive data, including receiving observation data 530 and new event notices A-Z from the event notice-sending computing devices 1-N 520, and/or otherwise communicate with notice-sending computing devices 1-N 520 and other computing devices via the network 522. Event notice-sending computing devices 1-N 520 represent generally any computing device or group of computing devices configured to send and receive network requests, send and receive data, including sending observation data 530 and/or new event notices A-Z, and/or otherwise communicate with task prioritization server 502 and other computing devices via the network 522.

Network 522 represents generally hardware components and computers interconnected by communications channels that allow sharing of resources and information. Network 522 may include a cable, wireless, fiber optic, or remote connection via a telecommunication link, an infrared link, a radio frequency link, or some combination of these, or any other connectors or systems that provide electronic communication. Network 522 may also include intermediate proxies, routers, switches, load balancers, and the like. The paths followed by network 522 between task prioritization server 502 and event notice-sending computing devices 1-N 520 as depicted in FIG. 5 represent the logical communication paths between these devices, not necessarily the physical paths between the devices.

In an example, task prioritization server 502 includes a processing resource 510 and a machine-readable storage medium 526 encoded with preference data creation instructions 528, notice receipt instructions 504, and prioritization instructions 508. In an example, the instructions 528 504 508 cause the task prioritization server 502 to implement a service to prioritize event notices utilizing past-preference pairings. In some examples, storage medium 526 may include additional instructions. In other examples, instructions 528 504 508 and any other instructions described herein in relation to storage medium 526 may be stored on a machine-readable storage medium remote from, but accessible to, task prioritization server 502 and processing resource 510.

Processing resource 510 may fetch, decode, and execute instructions stored on storage medium 526 to implement the functionalities described below. In other examples, the functionalities of any of the instructions of storage medium 526 may be implemented in the form of electronic circuitry, in the form of executable instructions encoded on a machine readable storage medium, or a combination thereof.

In examples, task prioritization server 502 may be any sort of a computing device. In some examples, task prioritization server 502 may implement at least a portion of a service to prioritize event notices utilizing past-preference pairings. In some examples, instructions 528 504 508 may be part of a larger set of instructions implementing such an event notice prioritization service. In some examples, portions of an event notice prioritization service may be implemented on different computing devices.

In the example of FIG. 5, preference data creation instructions 528 stored at machine readable storage medium 520 may cause the task prioritization server 502 to create past-preference pairings 536. In an example, to create the past-preference pairings the server 502 receives observation data 530 indicative of an order of an operator's or operators' handling of a plurality of previous-period event notices 524 that were observed by the operator or operators.

In the example of FIG. 5, the observation data 530 includes data indicative of a first operator's 544 handling of a plurality of previous-period event notices 524 that were observed by the first operator 544, e.g., as the first operator 544 viewed incoming event notices during a prior period viewing. In an example, the first operator may view the incoming prior-period event notices 524 in a capacity as an employee of an IT service provider performing services for an enterprise customer that is supported by event notice-sending computing devices 1-N. In an example, the first operator 544 views the incoming previous event notices 524 via dashboard display, e.g. the dashboard display illustrated in FIG. 2 presented via a computer monitor 550, in order that the first operator 544 would take corrective actions 546 towards the high priority incoming event notices 524. In an example, the first operator 544 may utilize a mouse, keyboard, or other user interface for task prioritization server 502, or for another computing device, to take the corrective actions 546 that are indicated in the observation date 530. In an example, the first operator 544 may take a corrective action 546 by performing a fix on his or her own, or may take an assigning corrective action 546A by assigning an event notice to a second operator 548 in order that the second operator 548 will take another corrective action.

Figure 6:
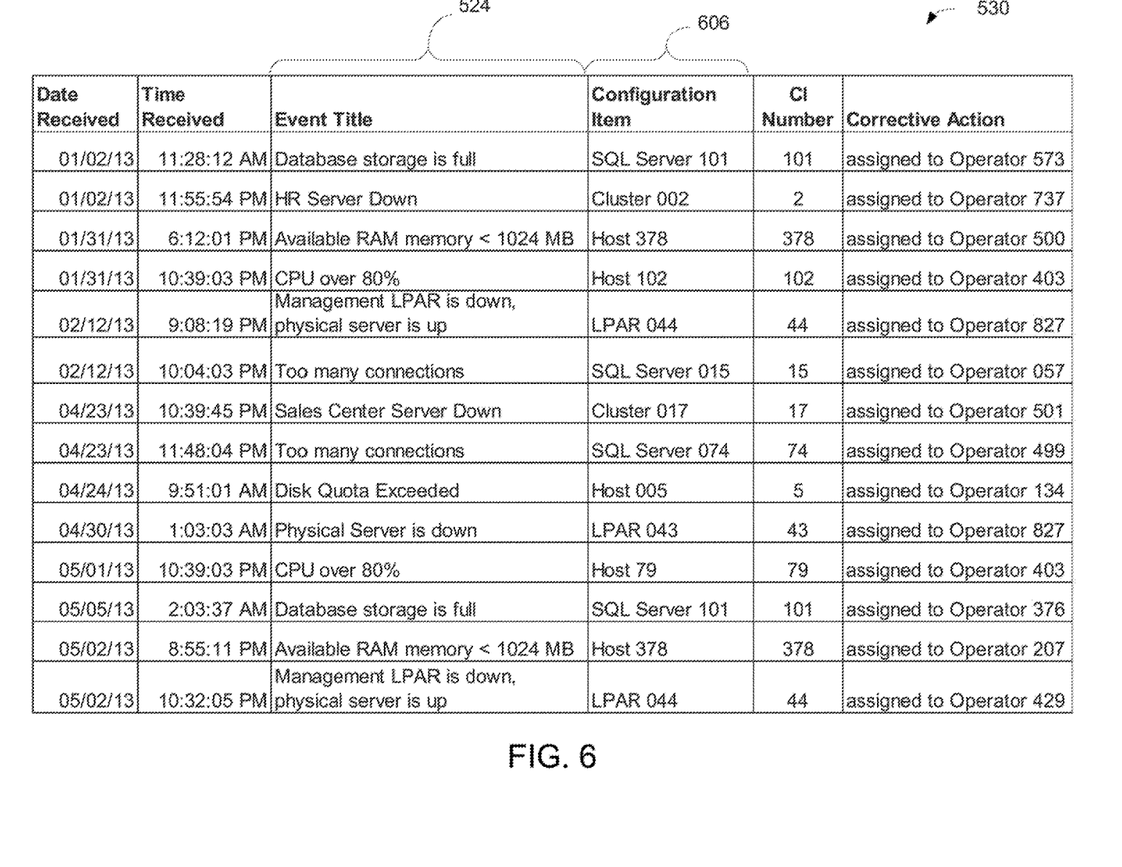
FIG. 6 is an example of observation data indicative of an order of operator handling of previous-period event notices, according to various examples.

Continuing with the example of FIG. 5, the preference data creation instructions 528 further cause server 502 to associate each of the operator-observed event notices 524 with a configuration item. FIG. 6 provides an example of observation data 530 that may be received at server 502, and illustrates the association of each of the operator-observed previous-period event notices 524 with a configuration item 606.

Returning to FIG. 5, task prioritization server 502 may then complete the process of generating past-preference pairings for previous-period event notices 524 by creating a past-preference pairing for each combination of two configuration items, with each pairing including a count of operator-exhibited preferences for addressing event notices associated with a first configuration item relative to event notices associated with a second configuration item.

In the example of FIG. 3 in view of FIG. 5, the past-preference pairings 536 are stored at server 502 in a matrix format within comparison cells. In this example, comparison cells are the numerically populated cells other the cells in the labeling row 314 and labeling column 316. In this example, each of the comparison cells associates a pair of configuration items with reduced functionality or degradation as indicated by the received prior-period event notices 524. Further, each of the comparison cells includes as an element or entry a count of occasions that an operator or operators presented with the pairing took corrective action with respect one of the pairing ahead of the other.

Returning to FIG. 5, the notice receipt instructions 504 stored at machine readable storage medium 526 may cause the task prioritization server 502 to receive a plurality of new event notices A-Z, with each such current notice indicative of a reduction in functionality or degradation of a configuration item. The access instructions 508 cause the task prioritization server 502 to access a database 540 that stores the configuration item past-preference pairings 536 that were created at server 502 pursuant to the preference data instructions 528. In other examples, the database 540 may also store configuration item past-preference pairings that are received at server 602 and that were generated at a computing device other than server 502. The prioritization instructions 508 cause the task prioritization server 502 to create a corrective action sequence 542 utilizing the past-preference pairings 536, the sequence 542 to sequence corrective actions to be taken to address the new event notices A-Z 514. In an example, the prioritization instructions 508 may apply a pairwise prioritization algorithm to create the sequence 542.

In this manner, the new event notices A-Z 514 can be accurately and reliably prioritize in an automated manner, without requirements of an IT service provider performing event notice/configuration item labeling or modeling. In examples, the receiving of new event notices A-Z 514 and/or the Observation Data 530 over the network 522 may be via a networking protocol. The networking protocols utilized may include, but are not limited to, Transmission. Control Protocol/Internet Protocol ("TCP/IP"), HyperText Transfer Protocol ("HTTP"), and/or Session Initiation Protocol ("SIP").

In some examples, the preference data creation instructions 528, notice receipt instructions 504, access instructions 506, and prioritization instructions 508 may be part of an installation package that, when installed, may be executed by processing resource 510 to implement the functionalities described herein in relation to the instructions 528 504 506 508. In such examples, storage medium 526 may be a portable medium, such as a CD, DVD, or flash drive, or a memory maintained by a server from which the installation package can be downloaded and installed. In other examples, the instructions 528 504 508 may be part of an application or applications already installed on authorization task prioritization server 502 including processing resource 510. In such examples, the storage medium 526 may include memory such as a hard drive, solid state drive, or the like. While in the example of FIG. 5 the storage medium 526 and memory 518 appear as separate components, in other examples some or all of memory 512 may be included within or a part of storage medium 534. In yet other examples, some or all of storage medium 526 may be included within or be a part of memory 512. In some examples, functionalities described herein in relation to FIG. 5 may be provided in combination with functionalities described herein in relation to any of FIGS. 1-4 and 6-7.

Figure 7:
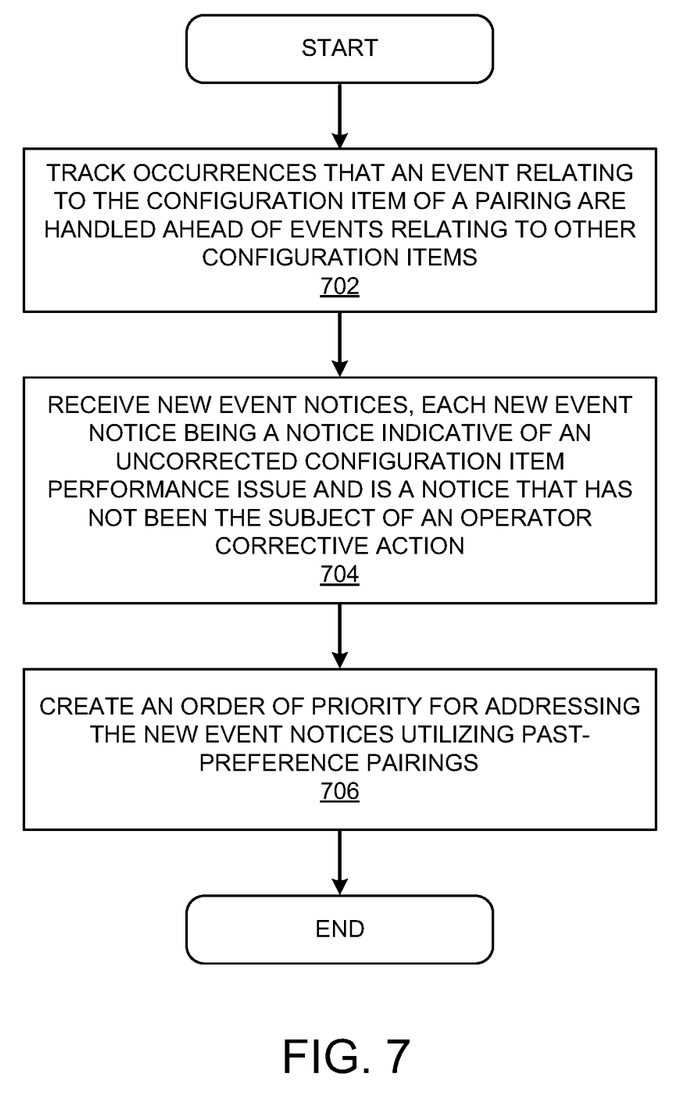
FIG. 7 is a flow diagram depicting steps taken to implement various examples.

FIG. 7 is a flow diagram of operation in a system according to various examples. In discussing FIG. 7, reference may be made to the diagrams of FIGS. 1 and 2 to provide contextual examples. Implementation, however, is not limited to those examples. Starting with FIG. 7, historical preference data indicative of order of user handling of a plurality of user-observed event notices is received. A pairing for each of the user-observed event notices is created, with each pairing associating an event notice with a configuration item. Occurrences that an event relating to the configuration item of the pairing are handled ahead of events relating to other configuration items are tracked for each pairing (block 702). Referring back to FIG. 5, the preference data creation instructions 528 (FIG. 5), when executed by processing resource 510 (FIG. 5), may be responsible for implementing block 702.

Continuing with FIG. 7, a plurality of new event notices are received. Each new event notice is a notice indicative of an uncorrected configuration item performance issue and is a notice that has not been the subject of an operator corrective action (block 704). Referring back to FIGS. 1 and 5, the notice receipt engine 104 (FIG. 1), or the notice receipt instructions 504 (FIG. 5), when executed by processing resource 510 (FIG. 5), may be responsible for implementing block 704.

Continuing with FIG. 7, an order of priority for addressing the new event notices utilizing the past-preference pairings is created (block 706). Referring back to FIGS. 1 and 5, the prioritization engine 108 (FIG. 1), or the prioritization instructions 508 (FIG. 5), when executed by processing resource 510 (FIG. 5), may be responsible for implementing block 706.

Various modifications may be made to the disclosed examples and implementations without departing from their scope. Therefore, the illustrations and examples herein should be construed in an illustrative, and not a restrictive, sense.

What is claimed is:

1. A system, comprising:
one or more hardware components to:
receive a plurality of event notices, with each notice indicative of degradation of a configuration item;
access configuration item past-preference pairings, with each pairing including a count of operator-exhibited preferences for event notices associated with a first configuration item relative to event notices associated with a second configuration item; and
create a prioritized ordering of the received event notices utilizing the past-preference pairings; and
a display device to display the prioritized ordering of the received event notices utilizing the past-preference pairings.

2. The system of claim 1, wherein the count of operator-exhibited preferences is a count of occurrences that an operator takes a corrective action relative to an event notice associated with the first configuration item ahead of taking the corrective action relative to an event notice associated with the second configuration item.

3. The system of claim 2, wherein the corrective action is an assignment of a task.

4. The system of claim 1, wherein the configuration item is a hardware or software component.

5. The system of claim 1, wherein the configuration item is a set of hardware and/or software components.

6. The system of claim 1, wherein the configuration item is a logical component.

7. The system of claim 1, wherein the degradation is a failure to meet a service level.

8. The system of claim 1, wherein the configuration item is a grouping of hardware and/or software components defined by a business service that the components are utilized to support.

9. The system of claim 1,
wherein the configuration item past-preference pairings are recorded within a matrix;
wherein the matrix includes a column for each configuration item, and includes a row for each configuration item; and
wherein the intersection of a row "a" and a column "b" defines a comparison cell "a/b" that includes a past-preference pairing that is a count of occasions that an operator took a corrective action on an event associated with a configuration item "a" ahead of an event associated with a configuration item "b".

10. The system of claim 1, wherein the one or more hardware components apply a pairwise prioritization algorithm to create the prioritized ordering.

11. A non-transitory computer-readable storage medium comprising instructions that, when executed by a processor, cause a system to:
receive a plurality of event notices, with each notice indicative of a reduction in functionality of a configuration item;
access a database including configuration item past-preference pairings, with each pairing including a count of operator-exhibited preferences for addressing event notices associated a first configuration item relative to event notices associated with a second configuration item;
create a corrective action sequence utilizing the configuration item past-preference pairings, the sequence to sequence corrective actions to be taken to address the event notices; and
display the created corrective action sequence on a display device.

12. The medium of claim 11, wherein the instructions cause the system to create the configuration item past-preference pairings, including:
receive data indicative of order of operator handling of a plurality of operator-observed event notices;
associate each of the operator-observed event notices with a configuration item;
count, for the configuration item, occurrences that event notices relating to the configuration item are handled ahead of events relating to other configuration items.

13. The medium of claim 11,
wherein the operator-exhibited preferences include a matrix with a plurality of comparison cells;
wherein each of the comparison cells associates a pairing of reduced functionality configuration items; and
wherein each of the comparison cells includes a count of occasions that an operator presented with the pairing took corrective action with respect to one of the event notice in a pairing ahead of the other event notice in the pairing.

14. The medium of claim 13, wherein the count of preferences is a count of occurrences that the operator takes a corrective action relative to an event notice associated with the first configuration item ahead of taking the corrective action relative to an event notice associated with the second configuration item.

15. A processor-implemented method, comprising:
receiving, by a processor, historical preference data indicative of order of user handling of a plurality of user-observed event notices;
creating, by the processor, a pairing for each of the user-observed event notices, each pairing associating an event notice with a configuration item;
tracking, by the processor and for each pairing, occurrences that an event relating to the configuration item of the pairing are handled ahead of events relating to other configuration items;
receiving a plurality of new event notices,
wherein each new event notice is indicative of an uncorrected configuration item performance issue, and
wherein each new event notice is a notice to which an operator has not taken a corrective action;
creating an order of priority for addressing the new event notices utilizing the historical preference data; and
displaying the created order of priority for addressing the new event notices.

* * * * *